Aug. 13, 1957     A. L. FREEDLANDER     2,802,763

FUEL CELL CONSTRUCTION

Filed Nov. 10, 1951

INVENTOR.
A. L. FREEDLANDER
BY
ATT'Y.

United States Patent Office 2,802,763
Patented Aug. 13, 1957

2,802,763

FUEL CELL CONSTRUCTION

Abraham Lincoln Freedlander, Dayton, Ohio, assignor to The Dayton Rubber Company, a corporation of Ohio Application November 10, 1951, Serial No. 255,849

5 Claims. (Cl. 154—43.5)

The present invention relates to fuel containers and more particularly to improved fuel containers of the self-sealing type for use with hydrocarbon fuels.

Self-sealing fuel tanks, or fuel cells as they are commonly known, are used on military aircraft and combat vehicles, such as tanks, armored cars, etc. These fuel cells are generally constructed with a plurality of layers, one of which is a layer of a rubber compound which on perforation of the tank by a projectile will swell through contact with the leaking contents of the tank so that the perforation will thus be closed to prevent further leakage.

Fuel cells of the type referred to commonly incorporate reinforcing and stiffening layers which will provide sufficient strength and rigidity to the tanks, while at the same time providing tear resistance and other desired properties for the walls of the tank. One such construction incorporates one or more layers of cord fabric, such layers being composed of parallel cords embedded in or coated with a desired rubber composition. Where the fuel cell is intended to receive fuel containing aromatic components, it is also desirable to utilize a barrier layer which is impermeable to the aromatic compounds.

In accordance with the present invention applicant has discovered that a highly satisfactory fuel cell construction may be obtained by the incorporation of one or more layers of a rubber composition having incorporated therewith a minor proportion of short-length fibers. The fibers referred to are incorporated by dispersing or milling into the rubber, discrete fiber particles, with the fibers being preferably aligned parallel to each other and extending in the same direction. This may be accomplished by calendering the rubber-fiber mixture. The fibers are preferably of textile material, such as cotton, rayon, or other known textile fibers, either natural or synthetic, or mixtures thereof. Fuel cells incorporating this construction have been found to give excellent resistance to shock, stresses, and strains, and provide excellent bullet-sealing properties where this is required. Important economies both in raw material cost and ease of assembly, are effected.

It is, therefore, an object of the present invention to provide a novel fuel cell construction having excellent strength and strain resistance.

It is a further object of the present invention to provide a novel fuel cell construction having improved bullet-sealing properties, as well as economy of manufacture and ease of assembly.

Typical fuel cell constructions incorporating the principles of my invention are illustrated in the accompanying drawings, in which:

Figure 1 describes in perspective a portion of the wall of a fuel cell showing the laminar construction, with each layer in cross section.

Figure 1:
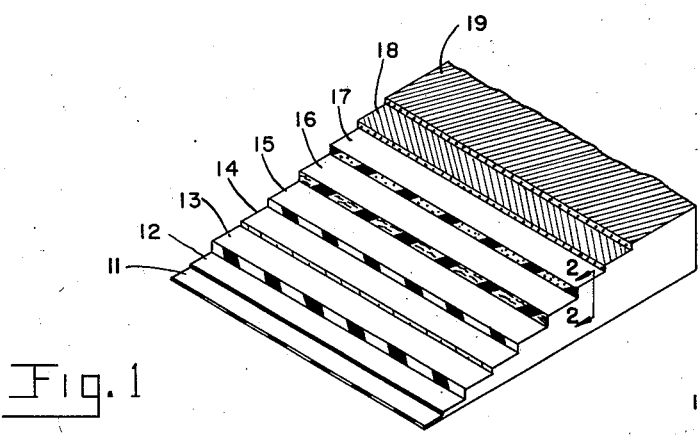
Figure 2:
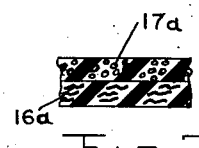
Figure 2 is a partial cross section along lines 2—2 of Figure 1 illustrating the structure of the rubber-fiber layers of the invention.
Figure 3:
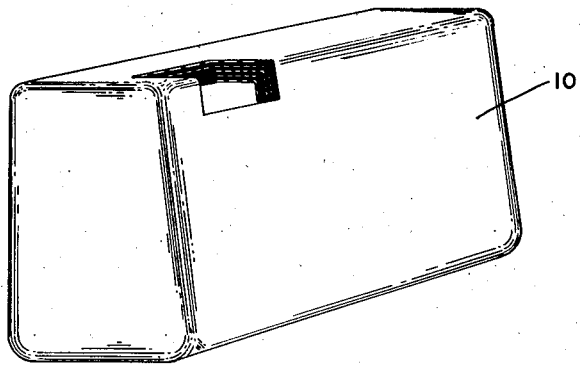
Figure 3 is a view in perspective of an assembled self-sealing type of fuel cell of simple form, having a portion of the wall thereof cut out to show the laminated wall structure.

In assembling the self-sealing fuel tank construction illustrated in Figures 1 to 3, a form is selected having the desired configuration and the various layers are built up around the form. The assembly is then cured in open steam, or in any other suitable manner.

Referring to Figures 1 to 3, tank 10 is formed with layer 11 which is a liner formed of a material resistant to the action of the hydrocarbon fuels such as gasoline. Preferably, this liner is composed of a butadiene-acrylonitrile copolymer of the Buna-N type. In a typical construction this layer would be formed having a gauge of about 0.030 in. Over the liner a barrier layer 12 is applied which is composed of material impervious to aromatic hydrocarbons which may permeate the liner material. This barrier is preferably composed of nylon, which is a linear polyamide of the type described in Carothers Patent No. 2,252,554, dated August 12, 1941. The nylon material may be applied in the form of sheets but is preferably applied by coating or spraying with a nylon cement made by dissolving nylon flakes in a solution of isopropanol and water. In a typical construction the barrier layer is applied in a thickness of 0.003 in. Superimposed upon layer 12 is a layer of sealant 13 which is composed of material which will swell on contact with hydrocarbons such as gasoline or oil. This layer may be composed of natural rubber, synthetic rubber of the butadiene-styrene copolymer type, neoprene, or mixtures of natural rubber with one or more of the synthetic rubbers. This sealant is applied in the form of unvulcanized sheets. In a typical construction the sealant layer may be applied in a thickness of about 0.110 in.

In the construction illustrated, a reinforcing layer of cord 14 is superimposed upon the sealant. This cord layer is preferably composed of rayon or nylon cord fabric which is skim coated on both sides with the same compound of which the sealant is composed. The cords have been preliminarily dipped in a liquid resorcinol-formaldehyde-latex compound, such as is known to the art, to promote adhesion of rubber to rayon. The gauge of this layer in a typical construction is about 0.30 in. Another layer of sealant 15 is applied to layer 14. This sealant is similar or identical in composition to layer 13. The layers are adhered to each other by coatings of vulcanizable rubber cement applied between the layers. 16 and 17 indicate two successive layers of rubber-fiber composition. Each of these layers is composed of any desired resilient rubberlike composition, preferably a blend of natural rubber and a synthetic rubber of the butadiene-styrene copolymer type. The rubber compound contains the desired quantity of textile fibers dispersed therein by milling or otherwise, the compound being calendered to orient the fibers parallel to each other in the same direction. The fibers are preferably of cotton or rayon although other natural or synthetic textile fibers may be used. Preferably, the compound contains from 30% to 60% of fiber based on the rubber by weight. The fibers generally range in length from $\frac{1}{16}$ in. to $\frac{5}{8}$ in. Where the fuel tank requires rigidity in two directions, the fiber-rubber layers are superimposed in such a manner that the fibers in one layer run at an angle to the fibers in the adjacent layer, maximum rigidity in both directions being obtained by applying these layers so that the fibers in one layer run at a 90 degree angle to those in the adjacent layer. Where increased rigidity in one direction is desired the layers may be superimposed with the fibers running in the same direction or a single layer of rubber-fiber composition may be used. In the construction illustrated in Figure 1 of the drawing two layers are used with the fibers in the adjacent layers running at 90 degree angles to each other. These layers are formed by milling the fiber into the rubber compound and calendering to form sheets and to align the fibers.

In Figure 2, a cross section of a portion of layers 16 and 17 is illustrated showing the fibers 16a in 16 extending longitudinally and fibers 17a in 17 transversely.

Layers 18 and 19 which form the external surface of the tank are composed of cotton fabric skim coated on both sides and is similar or identical with the composition of layer 14. Where it is desised to give the external surface a greater degree of stiffness and hardness, the rubber with which the cord is coated may be compounded with a minor proportion of a phenolic resin, say 10% to 30% by weight. This resin which may be a granular phenol-formaldehyde polymer, is milled into the rubber compound prior to skim coating of the cord. Layer 19 is the same composition as layer 18 except that the outer skim coat is of a butadiene-acrylonitrile copolymer of the Buna-N type to give fuel and wear resistance to the surface of the tank. While a single layer of cord may be used as the outer layer, it is generally preferred to use two or more separate layers with the cord in one layer extending at an angle to the cord in the other layer.

Figure 4:
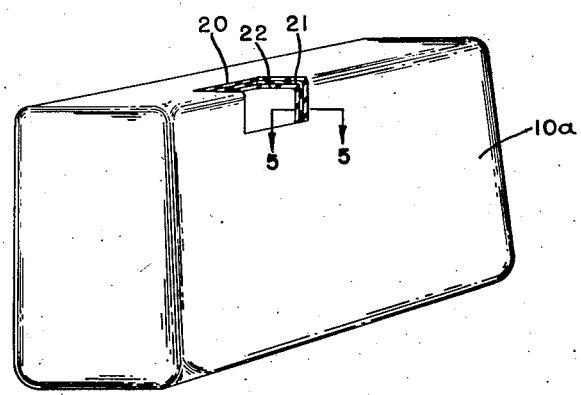
Figure 4 illustrates in perspective a non-self-sealing type of fuel cell incorporating the novel construction of this invention.
Figure 5:
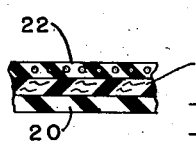
Figure 5 is an enlarged cross-sectional view taken along lines 5—5 of Figure 4 showing the structure of the cell wall.

The construction illustrated in Figures 4 and 5 represents a simplified version of that in Figures 1 to 3 which is applicable to a non-self-sealing type of fuel tank where it is desired merely to obtain resistance to fuel plus sufficient strength and rigidity to permit the tank to be properly supported. Such a tank is illustrated at 10a in Figure 4 in which layer 20 is the liner material of the same composition as liner 11 in Figure 1, and layer 21 is a layer of rubber-fiber compound similar to layers 16 and 17 of Figure 1. Two or more layers of the fiber compound may be used if desired. It is generally preferable to superimpose an external layer 22 of cord fabric, skim coated with an external layer of Buna-N type rubber, as described with respect to layer 19 in Figure 1. Figure 5, which is an enlarged cross-sectional view, illustrates the laminated structure of Figure 4 showing layers 20, 21, and 22.

In the manufacture of the above described tank, the various layers are assembled on a building form, which may either be of cardboard, or may be of collapsible construction. Suitable inlet and outlet fittings are provided and the assembly is then vulcanized. After curing, the form is removed, either by disintegration with hot water in the case of cardboard, or by collapsing and removal in the case of the collapsible form. The respective rubber-containing layers are compounded with suitable vulcanizing agents, accelerators, and other compounding agents, such as carbon black, fillers, plasticizers, etc., as are well known to the art. Vulcanization is carried out in such a manner that the sealant layers are partially, but not completely vulcanized. The time and temperature of the cure will of course depend on the nature of the compounding agents and the size of the tank, but may be readily determined by those skilled in the art.

I claim:

1. A self-sealing fuel tank adapted to seal punctures therein caused by projectiles which comprises in combination, a liquid hydrocarbon fuel-resistant flexible lining, a nylon barrier layer impermeable to aromatic hydrocarbons superimposed upon said liner, a rubber sealing layer which swells rapidly but does not dissolve in the hydrocarbon superimposed upon said liner, a reinforcing layer of cord fabric superimposed upon said rubber sealing layer, a second sealing layer of rubber superimposed upon said reinforcing cord layer, a reinforcing layer composed of rubber material having dispersed therein a substantial proportion of individual discrete textile fibers superimposed upon said last-named sealing layer, and an outer supporting layer composed of cord fabric the outer surface of which is coated with hydrocarbon fuel-resistant rubber, all of said layers being adhered to each other and vulcanized together.

2. A fuel tank according to claim 1 wherein the fiber-containing layer is composed of two separate layers wherein the fibers of each layer are aligned parallel to each other extending in the same direction and wherein one of said fiber-containing layers is positioned so that the fibers therein extend at an angle to the fibers in the adjacent fiber-containing layer.

3. A fuel tank according to claim 2 wherein the outer cord fabric layer is composed of two separate layers of cord fabric with the cord in one layer extending at an angle to the cord in the adjacent layer.

4. A fuel tank according to claim 3 wherein the outer cord layers are coated with a stiff rubber compound containing a minor proportion by weight of a phenol-aldehyde resin incorporated therein.

5. A self-sealing fuel tank adapted to seal punctures therein caused by projectiles which comprises a combination, a liquid hydrocarbon fuel-resistant flexible lining, a barrier layer impermeable to aromatic hydrocarbon superimposed upon said liner, a sealing layer which swells rapidly but does not dissolve in the hydrocarbon superimposed upon said liner, a reinforcing layer of cord fabric superimposed upon said rubber sealing layer, a second sealing layer of rubber superimposed upon said reinforcing cord layer, a reinforcing layer composed of rubber material having dispersed therein a substantial proportion of individual discrete textile fibers superimposed upon said last-named sealing layer and an outer supporting layer composed of cord fabric the outer surface of which is coated with hydrocarbon fuel-resistant rubber, all of said layers being adhered to each other and vulcanized together.

References Cited in the file of this patent

UNITED STATES PATENTS

| | | |
|---|---|---|
| 1,926,560 | Redman | Sept. 12, 1933 |
| 2,291,208 | Brown et al. | July 28, 1942 |
| 2,376,854 | Saunders et al. | May 22, 1945 |
| 2,431,001 | Sullivan | Nov. 18, 1947 |
| 2,439,366 | McLaughlin | Apr. 6, 1948 |
| 2,440,965 | Merrill et al. | May 4, 1948 |
| 2,446,815 | Davies et al. | Aug. 10, 1948 |
| 2,459,739 | Groten et al. | Jan. 18, 1949 |
| 2,626,882 | Gerke | Jan. 27, 1953 |